United States Patent [19]

Agrawal et al.

[11] Patent Number: 5,978,794
[45] Date of Patent: Nov. 2, 1999

[54] METHOD AND SYSTEM FOR PERFORMING SPATIAL SIMILARITY JOINS ON HIGH-DIMENSIONAL POINTS

[75] Inventors: Rakesh Agrawal, San Jose, Calif.; Kyuseok Shim, Bedminster, N.J.; Ramakrishnan Srikant, San Jose, Calif.

[73] Assignee: International Business Machines Corporation, Armonk, N.Y.

[21] Appl. No.: 08/629,688

[22] Filed: Apr. 9, 1996

[51] Int. Cl.$^6$ .................................................. G06F 17/00
[52] U.S. Cl. .................................. 707/3; 707/4; 707/101
[58] Field of Search ............................... 707/1–206, 200; 364/282.1, DIG. 1

[56] References Cited

U.S. PATENT DOCUMENTS

| | | | |
|---|---|---|---|
| 5,119,323 | 6/1992 | Nickerson et al. | 364/735 |
| 5,590,362 | 12/1996 | Baum et al. | 707/4 |
| 5,619,713 | 4/1997 | Baum et al. | 707/102 |
| 5,647,058 | 7/1997 | Agrawal et al. | 707/1 |
| 5,668,897 | 9/1997 | Stolfo | 382/283 |
| 5,715,468 | 2/1998 | Budzinski | 1/1 |
| 5,754,701 | 5/1998 | Yokoyama | 382/240 |

OTHER PUBLICATIONS

J. Nievergelt, H. Hinterberger, The Grid File: An Adaptable, Symmetric Multikey File Structure, Readings in Database Systems, 2nd Edition, Morgan Kaugmann Publishers, San Mateo, CA (book), 1984.

D. B. Lomet, B. Salzberg, The hB–Tree: a Multiattribute Indexing Method with Good Guaranteed Performance, Readings in Database Systems, Second Edition, Morgan Kaufmann Publishers, San Mateo, California (book), 1990.

N. Yazdani, M. Ozsoyoglu & G. Ozsoyoglu, A Framework for Feature–Based Indexing for Spatial Databases, Proceedings, 7th International Working Conf. on Scientific & Statistical Database Mng.(IEEE Computer Society Press) pp. 259–269, Sep. 28–30, 1994 Charlottesville, Virginia.

Brinkhoff, Kriegel, B. Seeger, Efficient processing of Spatial Joins Using R–trees, SIGMOD 5/93 Washington, DC, ACM 0–89791–592–5/93/0005/0237/1993.

K.I. Lin, H.V. Jagadish & C. Faloutsos, The TV–Tree: An Index Structure for High–Dimensional Data, VLDB Journal 3, pp. 517–542, 1994.

M.L. Lo & C. V. Ravishankar, Spatial Joins Using Seeded Trees, SIGMOD 94–5/94 Minneapolis, Minn, ACM 0–89791–639–5/94/0005, pp. 209–220, 1994.

T. Sellis, N. Roussopoulos, C. Faloutsos, The R+ –Tree: A Dynamic Index for Multi–Dimensional Objects, Dept. of Computer Science, Univ. of Maryland, College Park, MD 20742, Feb. 1987.

J. L. Bentley, Multidimensional Binary Search Trees Used for Associative Searching, ACM, vol. 18, No. 9, pp. 509–517, Sep. 1975.

(List continued on next page.)

*Primary Examiner*—Thomas G. Black
*Assistant Examiner*—David Yiuk Jung
*Attorney, Agent, or Firm*—Khanh Q. Tran

[57] ABSTRACT

A method and system are disclosed for performing spatial similarity joins on high-dimensional points that represent data objects of a database. The method comprises the steps of: generating a data structure based on the similarity distance $\epsilon$ for organizing the high-dimensional points, traversing the data structure to select pairs of leaf nodes from which the high-dimensional points are joined, and joining the points from selected pairs of nodes according to a joining condition based on the similarity distance $\epsilon$. An efficient data structure referred to as an $\epsilon$-K-D-B tree is disclosed to provide fast access to the high-dimensional points and to minimize system storage requirements. The invention provides algorithms for generating the $\epsilon$-K-D-B tree using biased splitting to minimize the number of nodes to be examined during join operations. The traversing step includes joining selected pairs of nodes and also self-joining selected nodes. Alternatively, the data structure is an R+tree generated using biased splitting.

23 Claims, 5 Drawing Sheets

OTHER PUBLICATIONS

H. V. Jagadish, A Retrieval Technique for Similar Shapes, ACM 0–89791–425–2/91/0005/0208, pp. 208–217, 1991.

R. Agrawal, K.I. Lin, H. S. Sawhney & K. Shim, Fast Similarity Search in the Presence of Noise, Scaling, and Translation in Time–Series Databases, Proceedings of the 21st VLDB Conference, Zurich, Switzerland, 1995.

H. Samet, (Book) The Design and Analysis of Spatial Data Structures, Chapter 2, Point Data, pp. 43–80, 1989 (QA76.9 D35 S26 1990).

A. Guttman, R–Trees: A Dynamic Index Structure for Spatial Searching, ACM 0–89791–12808/84/006/0047, pp. 47–57, 1984.

C. Faloutsos & K. I (David) Lin, Fast Map: A Fast Algorithm for Indexing, Data–Mining and Visualization of Traditional and Multimedia Datasets, ACM 0–89791–731–6/95/0005, pp. 163–174, 1995.

N. Beckman, H. P. Kriegel, R. Schneider, B. Seeger, The R* – tree: An Efficient and Robust Access Method for Points and Rectangles, ACM 089791–365/90/0005/0322 pp. 322–331, 1990.

J. T. Robinson, The K–D–B–Tree: A Search Structure for Large Multidimensional Dynamic Indexes, Proc. of ACM SIGMOD, Ann ARbor, Mi, Apr. 1981.

P. Mishra & M. H. Eich, Join Processing in Relational Databases, ACM Computing Surveys, vol. 24, No. 1, pp. 63–113, Mar. 1992.

M. Kitsuregawa, L. Harada and M. Takagi, Algorithms and performance Evaluation of Join Processing on KD–Tree Indexed Relations, Trans. Inst. Electron, Inf. Comm. Eng. D–I (Japan), vol. J76D–I, No. 4, pp. 172–183, Apr. 1993, 36 REF.

Jeffrey Ullman, Principles of Database And Knowledge–Base Systems, 1988, pp. 361–368, 375.

R.L. Graham et al., 3rd Edition, "Concrete Mathematics", Addison–Wesley Co., 1989, at pp. 67–78.

METHOD AND SYSTEM FOR PERFORMING SPATIAL SIMILARITY JOINS ON HIGH-DIMENSIONAL POINTS

FIELD OF THE INVENTION

This invention relates in general to computer databases, and in particular to an efficient method and system for performing spatial similarity joins on high-dimensional points representing data objects in a database.

BACKGROUND OF THE INVENTION

In computer database applications, similarity joins involve the finding of data objects in a database that satisfy certain similarity requirements. Examples of similarity joins include query applications using multimedia databases, medical databases, scientific databases, and time-series databases. In such applications, a user query typically requires the finding of all pairs of similar images, retrieving music scores similar to a target music score, determining products with similar selling patterns, or discovering all stocks with similar price movements from a target database. In many emerging applications of databases similar to these examples, the efficient processing of similarity join queries is essential where the data is represented as points in a space of high dimensionality.

The representation of key attributes of the data objects as points, or spatial data, in a multi-dimensional space is necessary to facilitate the search of the database to find similar data objects. With such a mapping between data objects and multi-dimensional points, the problem of finding similar objects in the database is reduced to finding points in the multi-dimensional space that are close, or similar, to a given point. This operation is referred to as a spatial similarity join. Two points are said to be close to each other if they are within a certain distance of each other, according to some metrics used to measure the distance. This distance is referred to as a similarity distance and includes data attributes that are common to the two points. A closely related problem is to find all pairs of similar data objects, which translates into finding all pairs of similar points that satisfy the distance requirement. Prior art algorithms for mapping data objects into points in a multi-dimensional space are described, for instance, in *"Fastmap: A Fast Algorithm for Indexing, Data Mining and Visualization of Traditional and Multimedia Datasets,"* by C. Faloutsos and K. -I. Lin, Proc. of ACM SIGMOD, pp. 163–174, 1995.

In addition to mapping data objects into multi-dimensional points, similarity join methods typically use a data structure or index for organizing the points so that they can be efficiently accessed during the join operation. Current spatial access methods have mainly concentrated on storing map information, which is usually a 2-dimensional or 3-dimensional space. The data structures commonly used in existing spatial access methods include the R-tree family, K-D-B tree, hB-tree, TV-tree, and Grid-file. These data structures are described, for instance, in *"R-trees: A Dynamic Index Structure for Spatial Searching,"* by A. Guttman, Proc. ACM SIGMOD, pp. 47–57, 1984, and *"The Design and Analysis of Spatial Data Structures,"* by H. Samet, Addison-Wesley, 1989.

While existing spatial similarity join methods work well in cases of low dimensional data points, they are inefficient in terms of execution time and the system storage required in performing the join operation when the number of dimensions of the space is large. A space of high dimensionality is usually needed for representing data with complex attributes such as images, financial models, etc. The poor performance and large storage requirement associated with existing spatial join methods are due to the fact that the data structures in these methods were designed mainly for points in a low-dimensional space.

For instance, consider a typical prior art join method based on the R-tree or the K-D-B tree data structure. The R-tree is a balanced tree, i.e., the path from its root to each leaf node is the same. Each node of the tree represents a rectangular region in the space, and each internal node of the tree stores a minimum bounding rectangle (MBR) for each child node of the internal node. The K-D-B tree is similar to the R+tree of the R tree family, except its bounding rectangles cover the entire space. In forming these trees, the leaf nodes are split equally in every dimension as the nodes are traversed. This leads to a very large number of leaf nodes that are within a specified distance of a given leaf node in the case where the number of dimensions is high. In an n-dimensional space, there will be $O(2^n)$ leaf nodes within the specified distance of every leaf node.

The large number of leaf nodes results in poor performance and utilization of the system storage, since there are more nodes to traverse. A prior art join algorithm typically traverses each leaf node, extends the MBR of the leaf node with similarity distance, and finds all leaf nodes whose MBR intersects with the extended MBR. The algorithm then performs a nested-loop or sort-merge join for the points in the leaf nodes with intersecting MBRs. Thus, because of the large number of leaf nodes, the number of joins performed, which is proportional to the number of examined leaf nodes, is undesirably large.

In addition, in performing the joins, system storage is needed to store data relating to the bounding regions associated with the tree nodes. For instance, for a K-D-B tree, the bounding rectangles are represented by the "min" and "max" points of the rectangles, which are typically maintained in storage during the similarity joins. The required system storage increases linearly with the number of dimensions of the space, and becomes undesirably large as the number of dimensions increases.

Furthermore, since the bounding regions corresponding to the child nodes of a node must be checked to determine whether to traverse the subtree starting from the examined node, the execution time for the method increases proportionally to the number of dimensions of the data points. Like the required system storage, this execution time also becomes undesirably large as the number of dimensions increases.

There is thus a need for an efficient method for performing spatial similarity joins on high-dimensional points that has a short execution time, based on an efficient data structure, and does not require a large amount of storage space during the performance of the similarity joins.

SUMMARY OF THE INVENTION

It is an object of the present invention to provide a method for performing spatial similarity joins on high-dimensional points with a relatively short execution time.

Another object of the present invention is to provide an efficient data structure for representing the high-dimensional points to be joined. The data structure is based on the similarity distance E used for finding pairs of similar points.

Still another object of the present invention is a method for performing spatial similarity joins on high-dimensional points that does not require a large amount of storage space of the system performing the method.

The present invention achieves the foregoing and other objects by providing a method for performing spatial similarity joins on points in a high-dimensional space by finding pairs of points within an $\epsilon$ distance of each other, according to some metrics used for measuring the distance between two points. The high-dimensional points represent data objects of a database from which similar data objects are to be found. In accordance with the invention, the method first generates a data structure, based on the similarity distance $\epsilon$, that represents the high-dimensional points. The data structure typically has a root node that branches into interior nodes, and terminates with its leaf nodes. Each leaf node is associated with a subset of points in the high-dimensional space. Next, the method traverses the interior nodes of the data structure, starting from the root node, to select pairs of leaf nodes from which points are to be joined. The method then joins the points from the selected pairs of leaf nodes based on the joining condition that the distance between any two points to be joined is at most the similarity distance $\epsilon$.

In accordance with the invention, the data structure is an $\epsilon$-K-D-B tree having multiple dimensions. In generating the $\epsilon$-K-D-B tree, the method splits any of its leaf nodes into $\lfloor 1/\epsilon \rfloor$ child nodes such that the width of each child node in the split dimension is $\epsilon$ or slightly greater than $\epsilon$, whenever the number of points in the leaf node exceeds a predetermined value. The splitting typically depends on the depth of the leaf node, which is the distance between the root of the tree and the leaf node. For instance, if i is the depth of the leaf node, then the i-th dimension of the data structure may be used for splitting the leaf node. Also, the order of the dimensions to be split may be determined based on any correlations between the dimensions so as to minimize system storage requirements during the joins.

The splitting is preferably based on a biased splitting to minimize the number of leaf nodes that need to be examined for joining. In a biased splitting, the $\epsilon$-K-D-B tree is split repeatedly in the same dimension until the length of the bounding rectangle of each leaf node in the splitting dimension is larger than $\epsilon$. The bounding rectangle for a leaf node corresponds to the space region including the high-dimensional points associated with that leaf node.

The performance of the method may be further improved by sorting the points in each leaf node on a dimension that is not used for splitting. The use of the common sort dimension eliminates the need for repeatedly sorting the points during the join operations.

In accordance with the invention, the step of traversing of the data structure includes joining pairs of nodes of the data structure. If both nodes of a pair are leaf nodes, then they are selected for joining the points included in the nodes according to the joining condition. If only one of the two nodes is a leaf node, then the leaf node is joined with each child node of the non-leaf node. If neither of the two nodes is a leaf node, then the child nodes of a first node in the pair are joined with the corresponding child nodes of a second node of the pair. Also, each n-th child node of the first node is joined with the (n+1)-th child node of the second node, and each n-th child node of the second node is joined with the (n+1)-th child node of the first node. The value of index n varies from 1 to N−1, where N is the number of child nodes for each first or second node.

Furthermore, the step of traversing includes the recursive self-joining of selected nodes. If an examined node is a leaf node, pairs of points from the node are joined according to the joining condition. If it is not a leaf node, then each child node of the examined node is joined to itself. Also, each pair of adjacent child nodes of the examined node is joined, according to the steps for joining pairs of nodes.

In an alternate embodiment of the invention, the data structure is an R+tree in which each internal node of the tree has a minimum bounding rectangle (MBR) corresponding to each child node of the internal node. The R+tree is generated using a biased splitting where one dimension of the tree is selected for splitting the leaf nodes repeatedly until the length of the MBR for each new interior node in the selected dimension is less than $2\epsilon$, where $\epsilon$ is the similarity distance.

Preferably, the method uses a nested-loop or sort-merge join that includes the joining of all pairs of points within a leaf node and also all pairs of points, each point being from a different leaf node, that satisfy the joining condition.

Additional objects and advantages of the present invention will be set forth in the description which follows, and in part will be obvious from the description and with the accompanying drawing, or may be learned from the practice of this invention.

DESCRIPTION OF THE PREFERRED EMBODIMENTS

The invention is primarily disclosed as a method for performing spatial similarity joins on high-dimensional points. However, persons skilled in the art will recognize that an apparatus, such as a conventional data processor, including a CPU, memory, I/O, program storage, a connecting bus, and other appropriate components, could be programmed or otherwise designed to facilitate the practice of the method of the invention. Such a processor would include appropriate program means for executing the method of the invention.

Also, an article of manufacture, such as a pre-recorded disk or other similar computer program product, for use with a data processing system, could include a storage medium and program means recorded thereon for directing the data processing system to facilitate the practice of the method of the invention. Such apparatus and articles of manufacture also fall within the spirit and scope of the invention.

Figure 1:
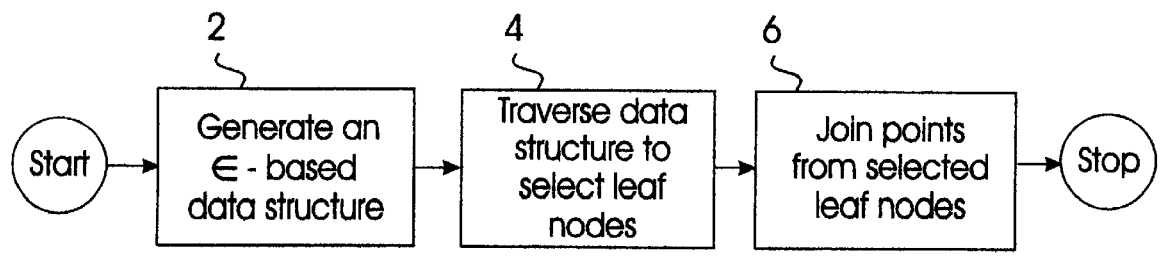
FIG. 1 is a flowchart showing the overall operation of the method for performing spatial similarity joins in accordance with the present invention.

FIG. 1 is a high-level flowchart showing the basic operation of the method for performing spatial similarity joins on high-dimensional points in accordance with the invention. The high-dimensional points represent the data attributes of data objects of a database from which similar data objects are to be found. Beginning with step 2, the method first generates a data structure for organizing the high-dimensional points to allow them to be efficiently accessed and determined whether they should be joined. The data structure is generated based on the similarity distance $\epsilon$ as described in more detail below. Typically, the data structure is a tree structure having a root node that branches into several interior nodes. Each interior node branches into other interior nodes at even lower depths. The tree data structure eventually terminates with its leaf nodes. Initially, all of the high-dimensional points in the data space are associated with the root node. As the data structure is formed, new leaf nodes are added to the data structure and previous leaf nodes become interior nodes. The high-dimensional points are distributed among the leaf nodes of the data structure so as each leaf node is associated with a subset of the points representing the data.

In step 4, the nodes of the data structure are traversed to select pairs of leaf nodes from which points are to be joined. The step of traversing is described in more detail below in accordance with FIGS. 5 and 6. In step 6, the points from the selected leaf nodes are joined according to a specified joining condition based on the similarity distance $\epsilon$. The condition for joining any two points typically requires that the distance between the two points is at most $\epsilon$.

Figure 2:
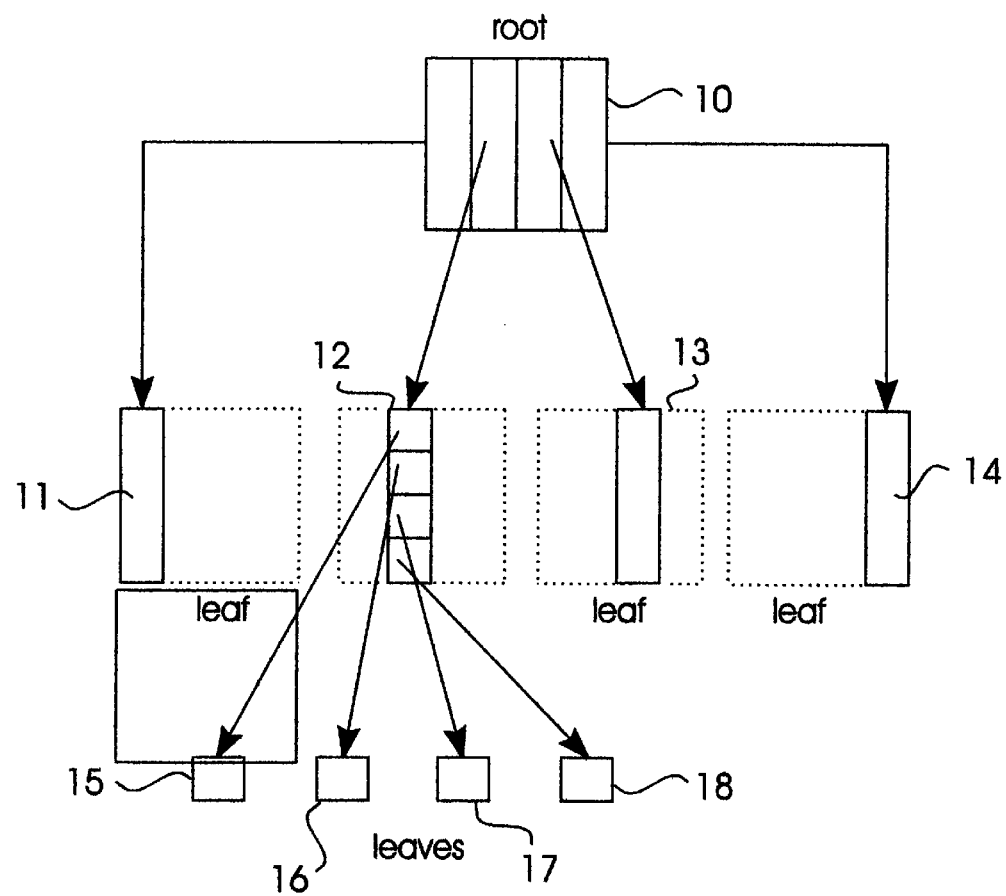
FIG. 2 illustrates the $\epsilon$-K-D-B tree data structure used in performing spatial similarity joins in accordance with the present invention, shown in a two-dimensional space.

FIG. 2 illustrates a preferred embodiment for the data structure used to perform similarity joins according to the invention. The data structure is an $\epsilon$-K-D-B tree having multiple dimensions. In generating the $\epsilon$-K-D-B tree, in accordance with step 2 of FIG. 1, each leaf node of the $\epsilon$-K-D-B tree is split into $\lfloor 1/\epsilon \rfloor$ child nodes whenever the number of points in the leaf node exceeds a predetermined threshold value. The splitting is such that the width of each new leaf node in the i-th dimension of the $\epsilon$-K-D-B tree would be either $\epsilon$ or slightly greater than $\epsilon$ and is typically based on the depth, or level, of the leaf node. For instance, if the leaf node is at a depth i, the i-th dimension of the $\epsilon$-K-D-B tree is used for splitting the node. Without loss of generality, we may assume that the similarity distance $\epsilon$ is an exact divisor of 1 in describing the invention.

For illustration purposes, the $\epsilon$-K-D-B tree of FIG. 2 is shown in a two dimensional space, with a fanout of four; i.e., each non-leaf node has four child nodes. The root node 10 originally branches into four leaf nodes, 11 through 14. During the generation of the $\epsilon$-K-D-B tree, the number of points in leaf node 12 is determined to be exceeding a user-specified threshold value for the tree, node 12 is then split into four child nodes, 15 through 18. The child nodes 15–18 become new leaf nodes of the $\epsilon$-K-D-B tree, while node 12 becomes an interior node.

In general, the order in which the dimensions of a tree are chosen for splitting the leaf nodes can significantly affect the amount of system storage needed in performing the similarity join, and consequently the cost of joining. In order to minimize the joining cost, correlations among the dimensions are taken into account in determining the order in which the dimensions are used for splitting. For example, a sample of the data from the database may be statistically analyzed so that the next dimension selected for splitting would have the least correlation with the dimensions previously selected for splitting.

There are generally two types of ordering the dimensions of a data structure in choosing the next splitting dimension: global ordering and local ordering. Global ordering uses the same split dimension for all the leaf nodes at each level or depth of the nodes, while local ordering chooses the split dimension based on the distribution of points in each leaf node.

Figure 3:
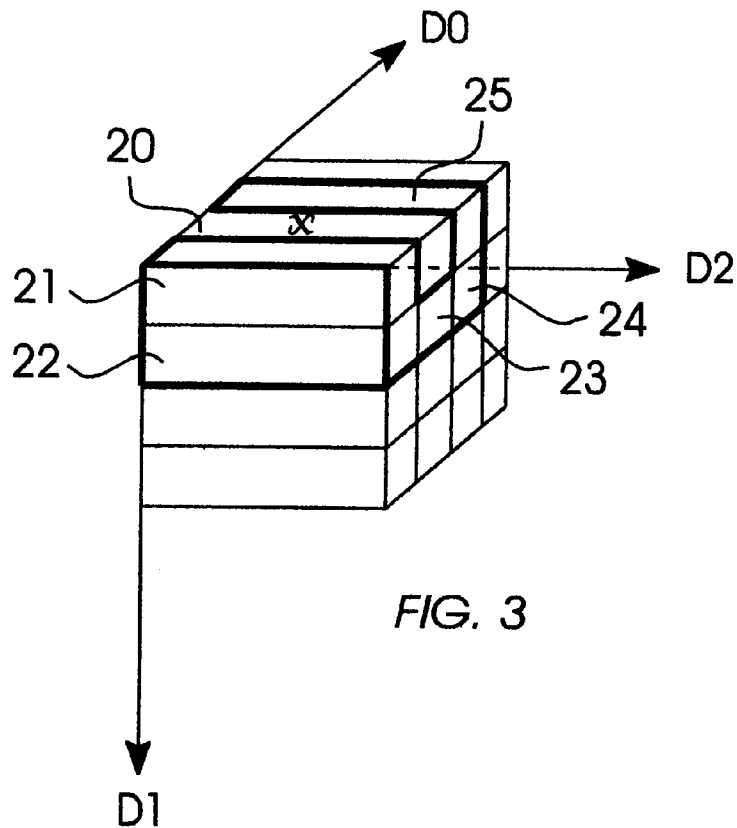
FIG. 3 shows an example of global ordering in selecting the dimensions of the $\epsilon$-K-D-B tree for splitting the leaf nodes, as a part of the step of generating the data structure, from block 2 of FIG. 1.
Figure 4:
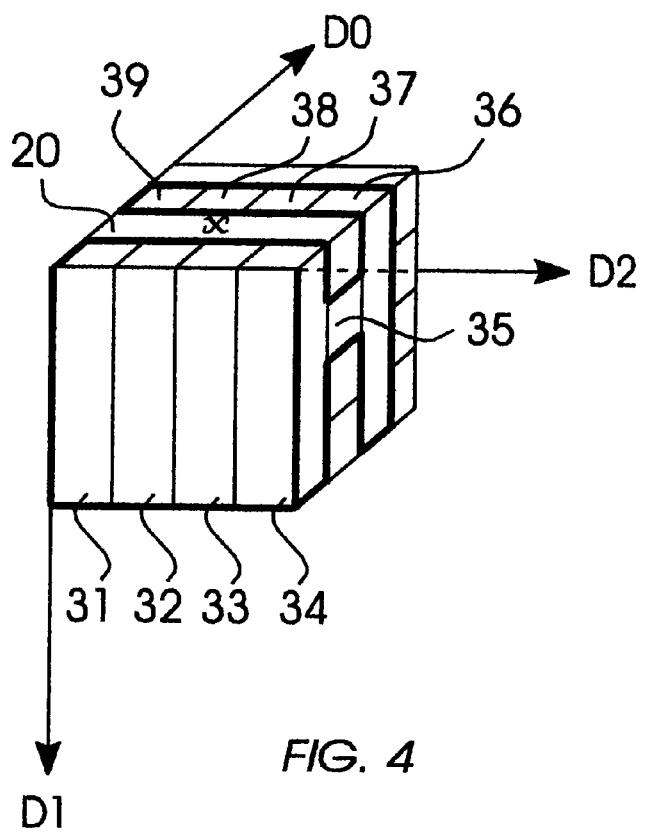
FIG. 4 illustrates an example of local ordering in selecting the dimensions of the $\epsilon$-K-D-B tree for splitting the leaf nodes, as part of the step of generating the data structure, from block 2 of FIG. 1.

FIGS. 3 and 4 illustrate the examples for global and local orderings in splitting a tree in a three-dimensional space, where the leaf nodes of the tree are represented as blocks in the three-dimensional space. For both types of ordering, the dimension D0 of the tree is used for splitting at the root node, i.e., at depth zero. For the global ordering shown in FIG. 3, only dimension D1 is used for splitting at depth 1. However, for the local ordering shown in FIG. 4, both dimensions D1 and D2 are chosen alternatively for the neighboring nodes of a leaf node at depth 1. The two types of ordering the split dimensions result in different numbers of neighbor leaf nodes that must be examined for each leaf node.

For instance, consider the leaf node represented by block 20 in FIG. 3. With global ordering, this leaf node has five neighbor leaf nodes represented by blocks 21 through 25. However, with local ordering, the leaf node represented by block 20 would have 9 neighbor leaf nodes, represented by blocks 31 through 39, as shown in FIG. 4. Notice that the space covered by the neighboring nodes of a leaf node in a global ordering case is a proper subset of the space covered by its neighboring nodes in the case of local ordering. In the example, the space represented by blocks 31 through 39 in FIG. 4 includes that represented by blocks 21 through 25 in FIG. 3. The difference in the space covered by the two types of ordering increases as the similarity distance $\epsilon$ decreases. Therefore, in accordance with the invention, global ordering is used for choosing the split dimensions to minimize the number of neighbor nodes that need to be examined.

For an $\epsilon$-K-D-B tree, the bounding rectangle for each leaf node corresponds to the space covering the points associated with the respective leaf node. The bounding rectangle for an internal can be readily computed using the pointers to its child nodes. Also, the splitting of the $\epsilon$-K-D-B tree leaf nodes is preferably a biased splitting where the same dimension of the $\epsilon$-K-D-B tree is split repeatedly until the length of the bounding rectangle for each leaf node in the split dimension is larger than $\epsilon$, before another dimension is used for splitting. Biased splitting significantly improves the performance of the method because, as long as the length of the bounding rectangle of each leaf node in the split dimension is more than $\epsilon$, at most two neighboring leaf nodes need to be considered in determining whether to join the points.

In addition, the performance of the similarity joins may be further improved by sorting all the high-dimensional points before the leaf nodes are split. For high-dimensional data, it is unlikely that all dimensions of the $\epsilon$-K-D-B tree are used for splitting. One of the unsplit dimensions thus may be used as a common sort dimension for sorting the high-dimensional points in every leaf node. The points are maintained in the sorted order even after they are distributed to the child nodes to avoid the need for repeatedly sorting the points during the join operation. In a later joining of points from selected pairs of leaf nodes, as described below for block 6 of FIG. 1, the method simply performs a sort-merging of the sorted points from the two leaf nodes to be joined. The sort-merging is made in the common sort dimension.

Figure 5:
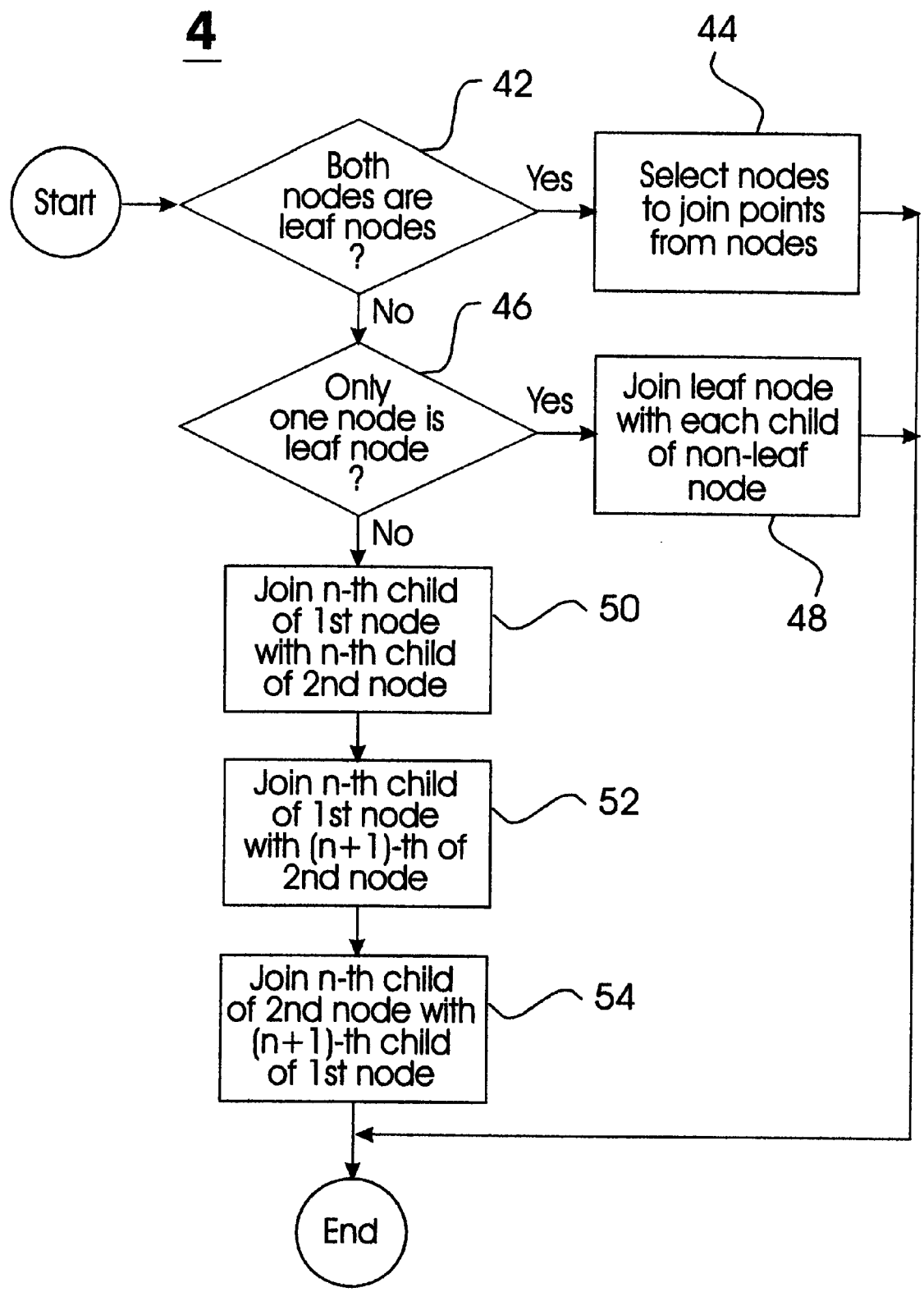
FIG. 5 is a flowchart showing further details for the step of joining two nodes, which is part of the step of traversing the data structure to select pairs of leaf nodes for joining, from block 4 of FIG. 1.
Figure 6:
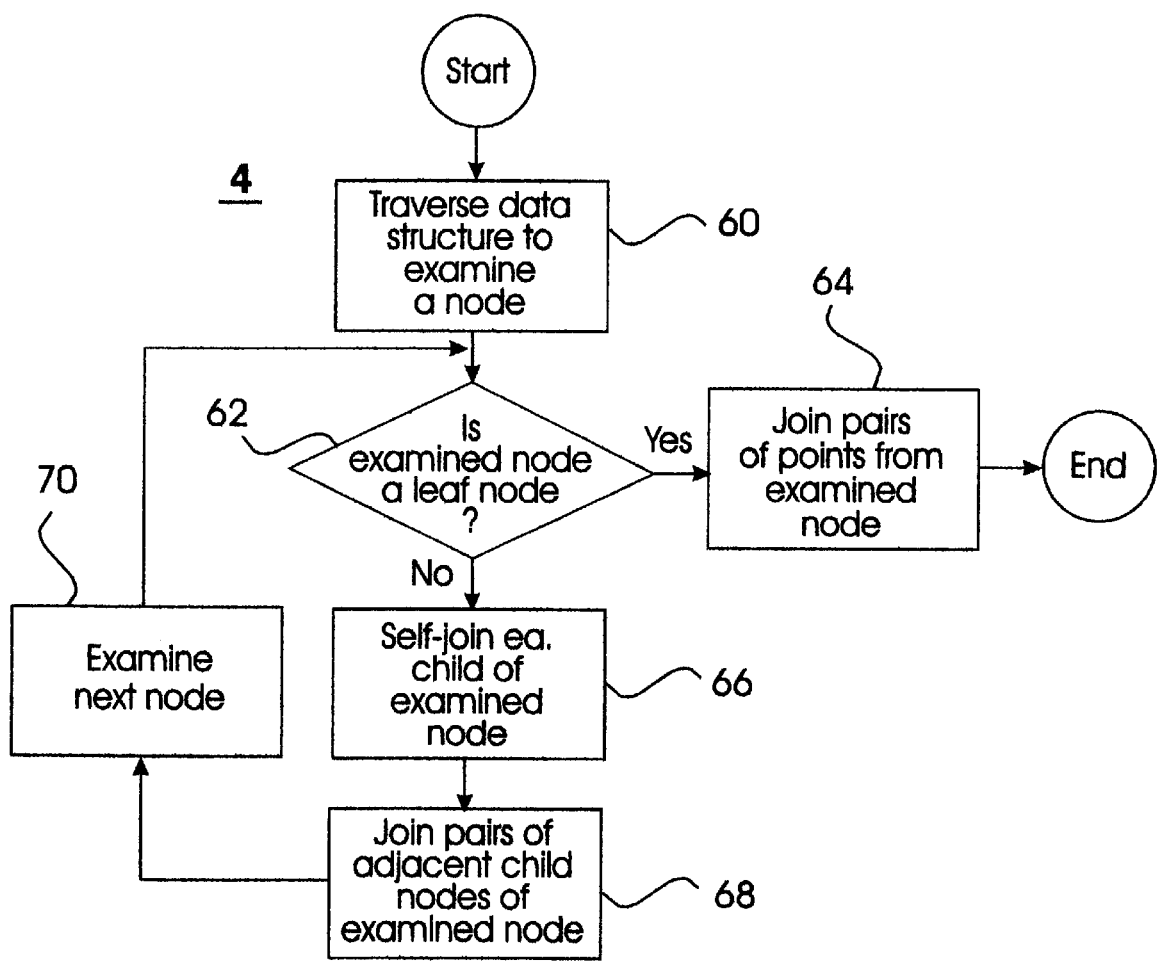
FIG. 6 is a flowchart showing further details for the step of self-joining a node, which is also a part of the step of traversing the data structure to select pairs of leaf nodes for joining, from block 4 of FIG. 1.

FIGS. 5 and 6 show further details for the step of traversing the $\epsilon$-based data structure, from block 4 of FIG. 1. The traversing step of block 4 includes the joining of selected pairs of nodes and the self-joining of selected nodes of the data structure. The self-joining of a node is the joining of the node with itself.

FIG. 5 shows the steps for joining any two nodes of the data structure. Starting with block 42, the two nodes are checked to determine whether they are leaf nodes. If both nodes are leaf nodes, then they are selected for joining the points from the two leaf nodes in block 44. The joining of the points from selected pairs of leaf nodes is in accordance with step 6 of FIG. 1, which is described in more detail below. If only one of the two nodes is a leaf node, then the leaf node is joined with every child node of the non-leaf node in block 48, using the steps for joining two nodes as currently described for FIG. 5. The operation in block 48 is typically implemented as a recursive execution of the steps for joining two nodes, as illustrated in the pseudo-code below.

In the case where both nodes are non-leaf nodes, as shown by the negative branch from block 46, the child nodes of the two nodes are joined according to blocks 50 through 56. First, at block 50, each n-th child node of the first node is joined with the corresponding n-th child node of the second node, recursively using the procedure for joining two nodes as currently described for FIG. 5. The value of index n changes from 1 to N, where N is the number of child nodes of each non-leaf node, i.e., the fanout of the $\epsilon$-K-D-B tree. At block 52, each n-th child node of the first node is joined with the (n+1)-th child node of the second node, n being from 1 to N−1. Similarly, at block 54, each n-th child node of the second node is joined with the (n+1)-th child node of the first node, n being from 1 to N−1. The operations in blocks 50, 52, and 54 are typically implemented as recursive executions of the steps for joining two nodes, as currently described for FIG. 5.

In addition to joining pairs of nodes, the method includes joining pairs of points where each pair includes a point each from a separate $\epsilon$-K-D-B tree. The two $\epsilon$-K-D-B trees represent subsets of the high-dimensional points, where the roots of the two trees are the two nodes to be joined described in accordance with FIG. 5.

The following pseudo-code illustrates a typical implementation of the joining of two nodes, x and y, according to FIG. 5.

```
procedure Join(x, y)
begin
    if leaf-node(x) and leaf-node(y) then
        leaf-join(x, y);
    else if leaf-node(x) then begin
        for i=1 to f do
            Join(x, y[i]);
    end
    else if leaf-node(y) then begin
        for i=1 to f do
            Join(x[i], y);
    end
    else begin
        for i=1 to f−1 do begin
            Join(x[i], y[i]);
            Join(x[i], y[i+1]);
            Join(x[i+1], y[i]);
        end
        Join(x[f], y[f]);
    end
end
```

FIG. 6 is a flowchart showing the operation for self-joining a node of the $\epsilon$-K-D-B tree, which is part of the step of traversing the tree, from block 4 of FIG. 1. First, at block 60, the tree is traversed to examine each of its nodes. At block 62, the examined node is checked to determine whether it is a leaf node. If the examined node is a leaf node, then pairs of points of the examined node are joined according to the specified joining condition, as shown by block 64. The joining condition is typically that the distance between any two points to be joined is at most the similarity distance $\epsilon$. If the examined node is not a leaf node, each of its child nodes is self-joined at block 66, in accordance with the steps for self-joining a node as currently described for FIG. 6. This operation is typically implemented as a recursive execution of the steps for self-joining a node, as shown in the pseudo-code below. Furthermore, each pair of adjacent child nodes of the examined node is joined at block 68, according to the steps for joining two nodes described for FIG. 5 above. Next, at block 70, another node of the $\epsilon$-K-D-B tree is examined, and the steps for self-joining are repeated for the newly examined node, beginning with block 62.

The following pseudo-code illustrates a typical implementation of the self-joining of a node x according to the operation shown in FIG. 6.

```
procedure Self-join(x)
begin
    if leaf-node(x) then
        leaf-self-join(x)
    else
        for i=1 to f−1 do begin
            Self-join(x[i]);
            Join(x[i], x[i+1]);
        end
end
```

In an alternate embodiment of the invention, the data structure is an R+tree or another type of data structure from the R-tree family such as an R-tree or R* tree. The R+tree has multiple dimensions, interior nodes, and leaf nodes. Similar to the $\epsilon$-K-D-B tree, the R+tree is generated by splitting any of its leaf nodes in which the number of points exceeds a threshold value. Each interior node has multiple minimum bounding rectangles (MBRs) that correspond respectively to its child nodes, where each MBR corresponds to the space covering the points associated with the respective child node.

Figure 7:
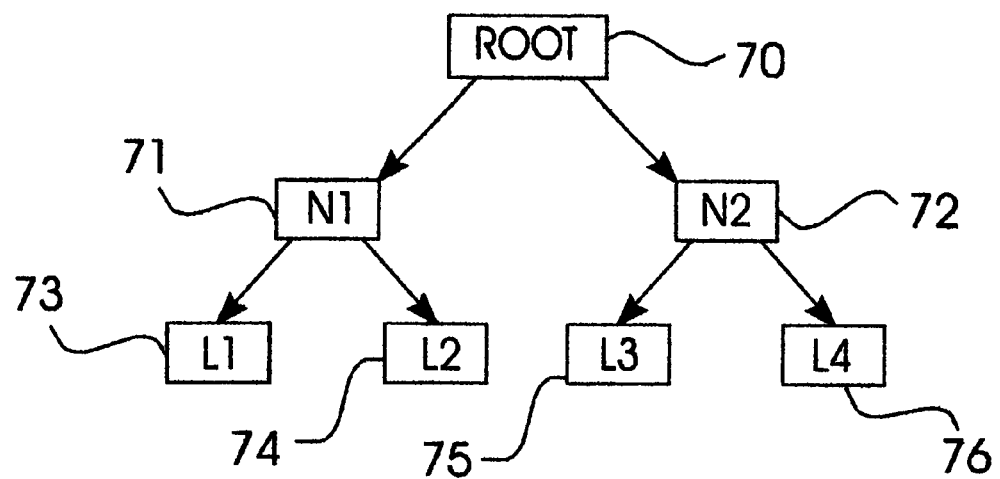
FIG. 7 illustrates a simple R-tree data structure used in performing spatial similarity joins in accordance with the present invention, shown in a two-dimensional space.
Figure 8:
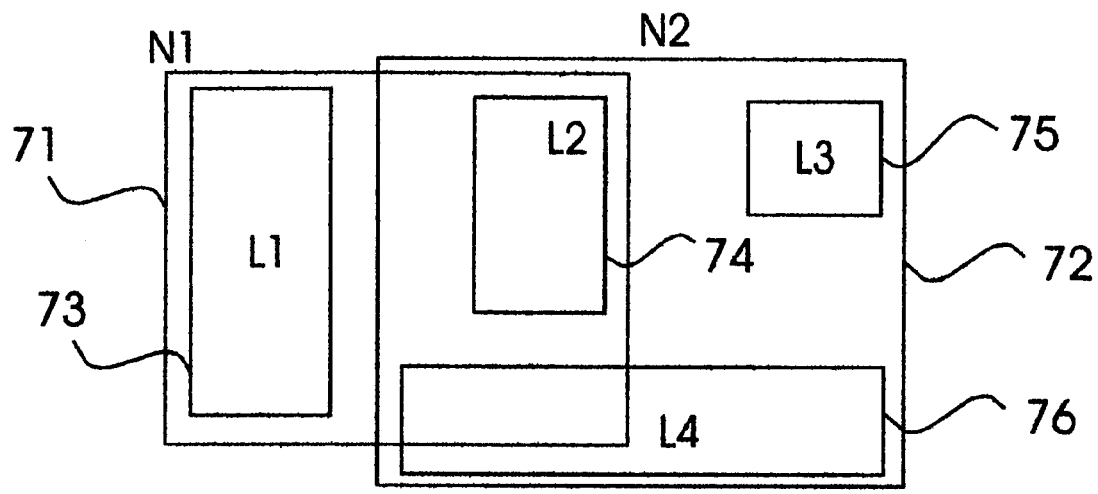
FIG. 8 illustrates the space covered by the bounding rectangles corresponding to the nodes of the R-tree of FIG. 7.

FIG. 7 shows a simple R-tree with a root node 70, internal nodes 71 and 72, and leaf nodes 73–76. FIG. 8 illustrates the bounding rectangles corresponding to the nodes of the R-tree in FIG. 7, represented in a two-dimensional space.

To minimize the number of neighbor nodes that must be examined while splitting the leaf nodes, biased-splitting is used for generating the R+tree as in the case for the $\epsilon$-K-D-B tree. Thus, one dimension of the R+tree is used for splitting the leaf nodes repeatedly until the length of the MBR for each new interior node (the split leaf node) in the split dimension is less than $2\epsilon$, before another dimension is selected for splitting the nodes.

Referring again to FIG. 1, the joining scheme used in joining pairs of leaf nodes (block 6) is preferably based on a nested-loop joining. A nested-loop join is described, for example, in "*Joining Processing in Relational Databases,*"

by P. Mishra and M. H. Eich, ACM Computing Surveys, Vol. 24, No. 1, 1992. (hereinafter Mishra et al.) The nested loop joining includes joining all pairs of points within a leaf node that satisfy the joining condition based on $\epsilon$. Furthermore, the joining step also includes joining all pairs of points that satisfy the joining condition, where each pair of points includes a point each from the first and second leaf nodes that have been selected for joining.

Alternatively, the joining is based on a sort-merge join as described, for instance, also by Mishra et al. In a sort-merge join, the joining is typically done in two stages. Initially, the points are sorted on one dimension of the tree. Next, for each point examined, the method considers other points whose values on the sort dimension are within the $\epsilon$ distance of the value of the examined point, and determines whether these points are within the similarity distance of the examined point.

Using the foregoing specification, the invention may be implemented using standard programming or engineering techniques including computer programming software, firmware, hardware or any combination or subset thereof. Any such resulting program, having computer readable program code means, may be embodied or provided within one or more computer readable or usable media, thereby making a computer program product, i.e., an article of manufacture, according to the invention. The computer readable media may be, for instance, a fixed (hard) drive, disk, diskette, optical disk, magnetic tape, semiconductor memory such as read-only memory (ROM), etc., or any transmitting/receiving medium such as the Internet or other communication network or link. The article of manufacture containing the computer programming code may be made and/or used by executing the code directly from one medium, by copying the code from one medium to another medium, or by transmitting the code over a network.

An apparatus for making, using, or selling the invention may be one or more processing systems including, but not limited to, a central processing unit (CPU), memory, storage devices, communication links, communication devices, servers, I/O devices, or any sub-components or individual parts of one or more processing systems, including software, firmware, hardware or any combination or subset thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system or computer sub-component embodying the invention and to create a computer system or computer sub-component for carrying out the method of the invention.

While several preferred embodiments of the invention have been described, it should be apparent that modifications and adaptations to those embodiments may occur to persons skilled in the art without departing from the scope and the spirit of the present invention as set forth in the following claims.

What is claimed is:

1. A method for performing similarity joins on high-dimensional points representing data objects of a database, the method comprising the steps of:

generating a multi-dimensional data structure having a plurality of leaf nodes for organizing the points, each leaf node being split into $\lfloor 1/\text{epsilon} \rfloor$ child nodes, where epsilon is a similar distance, based on the depth of the leaf node whenever the number of points associated with the leaf node exceeds a predetermined value, the dimensions used for splitting the nodes being in an order of correlation among the dimensions such that one selected for splitting next has the least correlation with previously used dimensions;

traversing the interior nodes of the data structure to select pairs of leaf nodes from which the points are joined; and joining the points from the selected pairs of leaf nodes based on a joining condition that the distance between any two points to be joined is at most epsilon.

2. The method as recited in claim 1, wherein:

the step of generating a data structure includes sorting the points in each leaf node using one of the dimensions not used for splitting the leaf nodes as a common sort dimension; and step of joining the points includes, for each pair of leaf nodes to be joined, the step of sort-merging the points associated with the pair of leaf nodes based on the common sort dimension.

3. The method as recited in claim 1, wherein the step of traversing includes joining a first node and a second node, the step of joining the first and second nodes including the steps of:

a) if the first and second nodes are both leaf nodes, then selecting the first and second nodes for joining;

b) if the first node is a leaf node and the second node is not a leaf node, then joining the first node with each child node of the second node; and c) if neither the first nor the second node is a leaf node, then:

i) joining each n-th child node of the first node with a corresponding n-th child node of the second node, n being from 1 to N, where N is the number of child nodes from each node of the data structure except the leaf nodes;

ii) joining each n-th child node of the first node with an (n+1)-th child node of the second node, n being from 1 to N−1; and iii) joining each n-th child node of the second node with an (n+1)-th child node of the first node, n being from 1 to N−1.

4. The method as recited in claim 3, wherein:

the data structure includes first and second epsilon-KDB trees, the first and second epsilon-KDB trees each representing a set of the points, the root nodes of the first and second epsilon-KDB trees being the first and second nodes to be joined, respectively; and the step of joining the points includes joining pairs of first and second points based on the joining condition, the first and second points being respectively from the first and second epsilon-KDB, trees.

5. The method as recited in claim 1, wherein the step of traversing includes self-joining selected nodes of the data structure, the step of self-joining including, for each examined node in the data structure, the steps of:

a) if the examined node is a leaf node, then joining pairs of points of the examined node based on the joining condition; and b) if the examined node is not a leaf node, then:

i) self-joining each child node of the examined node; and ii) joining each pair of adjacent child nodes of the examined node.

6. The method as recited in claim 1, wherein:

the data structure includes an R+tree that further comprises a root node and a plurality of dimensions;

the step of generating a data structure includes splitting any leaf node of the R+tree into a plurality of child nodes whenever the number of points in the leaf node exceeds a predetermined value; and each internal node of the R+tree has a minimum bounding rectangle MBR corresponding to each child node of the internal node, the MBR corresponding to the space including the points associated with the child node.

7. The method as recited in claim 6, wherein the splitting is based on biased-splitting such that one dimension of the R+tree is selected for splitting the leaf nodes repeatedly until the length of the MBR of each new interior node in the selected dimension is less than 2 epsilons, before another dimension is used for splitting.

8. A computer program product for use with a computer system for directing the system to perform spatial similarity joins on high-dimensional points, the points representing data objects of a database, the computer program product comprising:

a computer readable medium;

means, provided on the computer-readable medium, for directing the system to generate a multi-dimensional data structure having a plurality of leaf nodes for organizing the points, each leaf node being split into $\lfloor 1/epsilon \rfloor$ child nodes, where epsilon is a similar distance, based on the depth of the leaf node whenever the number of points associated with the leaf node exceeds a predetermined value, the dimensions used for splitting the nodes being in an order of correlation among the dimensions such that one selected for splitting next has the least correlation with previously used dimensions;

means, provided on the computer-readable medium, for directing the system to traverse the interior nodes of the data structure to select pairs of leaf nodes from which the points are joined; and means, provided on the computer-readable medium, for directing the system to join the points from the selected pairs of leaf nodes based on a joining condition that the distance between any two points to be joined is at most epsilon.

9. The computer program product as recited in claim 8, wherein:

the means for directing to generate a data structure includes means, provided on the computer-readable medium, for directing the system to sort the points in each leaf node using one of the dimensions not used for splitting as a common sort dimension; and the means for directing to join the points includes means, provided on the computer-readable medium, for directing the system to sort-merge, for each pair of leaf nodes to be joined, the points associated with the pair of leaf nodes based on the common sort dimension.

10. The computer program product as recited in claim 8, wherein the means for directing to traverse includes means, provided on the computer-readable medium, for directing the system to join a first node and a second node, the means for directing to join the first and second nodes including:

a) if the first and second nodes are both leaf nodes, then means, provided on the computer-readable medium, for directing the system to select the first and second nodes for joining;

b) if the first node is a leaf node and the second node is not a leaf node, then means, provided on the computer-readable medium, for directing the system to join the first node with each child node of the second node; and c) if neither the first nor the second node is a leaf node, then:

i) means, provided on the computer-readable medium, for directing the system to join each n-th child node of the first node with a corresponding n-th child node of the second node, n being from 1 to N, where N is the number of child nodes from each node of the data structure except the leaf nodes;

ii) means, provided on the computer-readable medium, for directing the system to join each n-th child node of the first node with an (n+1)-th child node of the second node, n being from 1 to N−1; and iii) means, provided on the computer-readable medium, for directing the system to join each n-th child node of the second node with an (n+1)-th child node of the first node, n being from 1 to N−1.

11. The computer program product as recited in claim 10, wherein:

the data structure includes first and second epsilon-KDB trees, the first and second epsilon-KDB trees each representing a set of the points, the root nodes of the first and second epsilon-KDB trees being the first and second nodes to be joined, respectively; and the means for directing to join the points includes means, provided on the computer-readable medium, for directing the system to join pairs of first and second points based on the joining condition, the first and second points being respectively from the first and second epsilon-KDB trees.

12. The computer program product as recited in claim 8, wherein the means for directing to traverse includes means, provided on the computer-readable medium, for directing the system to self-join selected nodes of the data structure, the means for directing to self-join including, for each examined node of the data structure:

a) if the examined node is a leaf node, then means, provided on the computer-readable medium, for directing the system to join pairs of points of the examined node based on the joining condition; and b) if the examined node is not a leaf node, then:

i) means, provided on the computer-readable medium, for directing the system to self-join each child node of the examined node; and ii) means, provided on the computer-readable medium, for directing the system to join each pair of adjacent child nodes of the examined node.

13. The computer program product as recited in claim 8, wherein:

the data structure includes an R+tree that further comprises a root node and a plurality of dimensions;

the means for directing to generate a data structure includes means, provided on the computer-readable medium, for directing the system to split any leaf node of the R+tree into a plurality of child nodes whenever the number of points in the leaf node exceeds a predetermined value; and each internal node of the R+tree has a minimum bounding rectangle MBR corresponding to each child node of the internal node, the MBR corresponding to the space including the points in the child node.

14. The computer program product as recited in claim 13, wherein the splitting is based on biased-splitting such that one dimension of the R+tree is selected for splitting the leaf nodes repeatedly until the length of the MBR of each new interior node in the selected dimension is less than 2 epsilons, before another dimension is used for splitting.

15. The computer program product as recited in claim 8, wherein the means for directing to join the points includes means, provided on the computer-readable medium, for directing the system to perform a nested-loop joining of all pairs of points of a leaf node, based on the joining condition.

16. A database system for performing similarity joins on high-dimensional points representing data objects of a database, the system comprising:

means for generating a multi-dimensional data structure having a plurality of leaf nodes for organizing the points, each leaf node being split into $\lfloor 1/\text{epsilon} \rfloor$ child nodes, where epsilon is a similar distance, based on the depth of the leaf node whenever the number of points associated with the leaf node exceeds a predetermined value, the dimensions used for splitting the nodes being in an order of correlation among the dimensions such that one selected for splitting next has the least correlation with previously used dimensions;

means for traversing the interior nodes of the data structure to select pairs of leaf nodes from which the points are joined; and means for joining the points from the selected pairs of leaf nodes based on a joining condition that the distance between any two points to be joined is at most epsilon.

17. The system as recited in claim 16, wherein:

the means for generating a data structure includes means for sorting the points in each leaf node using one of the dimensions not used for splitting as a common sort dimension; and the means for joining the points includes, for each pair of leaf nodes to be joined, means for sort-merging the points associated with the pair of leaf nodes based on the common sort dimension.

18. The system as recited in claim 16, wherein the means for traversing includes means for joining a first node and a second node, the means for joining the first and second nodes including:

a) if the first and second nodes are both leaf nodes, then means for selecting the first and second nodes for joining;

b) if the first node is a leaf node and the second node is not a leaf node, then means for joining the first node with each child node of the second node; and c) if neither the first nor the second node is a leaf node, then:

i) means for joining each n-th child node of the first node with a corresponding n-th child node of the second node, n being from 1 to N, where N is the number of child nodes from each node of the data structure except the leaf nodes;

ii) means for joining each n-th child node of the first node with an (n+1)-th child node of the second node, n being from 1 to N−1; and iii) means for joining each n-th child node of the second node with an (n+1)-th child node of the first node, n being from 1 to N−1.

19. The system as recited in claim 18, wherein:

the data structure includes first and second epsilon-KDB trees, the first and second epsilon-KDB trees each representing a set of the points, the root nodes of the first and second epsilon-KDB trees being the first and second nodes to be joined, respectively; and the means for joining the points includes means for joining pairs of first and second points based on the joining condition, the first and second points being respectively from the first and second epsilon-KDB trees.

20. The system as recited in claim 16, wherein the means for traversing includes means for self-joining selected nodes of the data structure, the means for self-joining including, for each examined node of the data structure:

a) if the examined node is a leaf node, then means for joining pairs of points of the examined node based on the joining condition; and b) if the examined node is not a leaf node, then:

i) means for self-joining each child node of the examined node; and ii) means for joining each pair of adjacent child nodes of the examined node.

21. The system as recited in claim 16, wherein:

the data structure includes an R+tree that further comprises a root node and a plurality of dimensions;

the means for generating a data structure includes means for splitting any leaf node of the R+tree into a plurality of child nodes whenever the number of points in the leaf node exceeds a predetermined value; and each internal node of the R+tree has a minimum bounding rectangle MBR corresponding to each child node of the internal node, the MBR corresponding to the space including the points in the child node.

22. The system as recited in claim 21, wherein the splitting is based on biased-splitting such that one dimension of the R+tree is selected for splitting the leaf nodes repeatedly until the length of the MBR of each new interior node in the selected dimension is less than 2 epsilons, before another dimension is used for splitting.

23. The system as recited in claim 16, wherein the means for joining the points includes means for performing a nested-loop joining of all pairs of points of a leaf node based on the joining condition.

* * * * *